(12) United States Patent
Wichmann (10) Patent No.: US 8,924,851 B2
(45) Date of Patent: Dec. 30, 2014

(54) NON-DESTRUCTIVE MANIPULATION OF IMAGES IN WEB DEVELOPMENT ENVIRONMENTS

(75) Inventor: Heiko Wichmann, Lüenburg (DE)

(73) Assignee: Adobe Systems Incorporated, San Jose, CA (US)

(*) Notice: Subject to any disclaimer, the term of this patent is extended or adjusted under 35 U.S.C. 154(b) by 1390 days.

(21) Appl. No.: 12/249,750

(22) Filed: Oct. 10, 2008

(65) Prior Publication Data

US 2014/0250363 A1  Sep. 4, 2014

(51) Int. Cl.
*G06F 17/00* (2006.01)
(52) U.S. Cl.
USPC ........... 715/255; 715/229; 715/271; 382/276; 382/309; 382/311
(58) Field of Classification Search
USPC ........... 715/255, 271, 272; 382/276, 309, 311
See application file for complete search history.

(56) References Cited

U.S. PATENT DOCUMENTS

| | | | |
|---|---|---|---|
| 7,576,752 B1* | 8/2009 | Benson et al. | 345/619 |
| 7,584,436 B2* | 9/2009 | Hirasaka | 715/811 |
| 7,631,253 B2* | 12/2009 | Hertzfeld et al. | 715/201 |
| 7,941,748 B1* | 5/2011 | Sundermeyer et al. | 715/255 |
| 2004/0189807 A1* | 9/2004 | Smith | 348/207.1 |
| 2006/0212792 A1* | 9/2006 | White et al. | 715/511 |
| 2007/0061365 A1* | 3/2007 | Giegerich et al. | 707/104.1 |
| 2007/0091123 A1* | 4/2007 | Akashi | 345/629 |
| 2008/0007788 A1* | 1/2008 | Good et al. | 358/302 |
| 2008/0177800 A1* | 7/2008 | Arkhipov et al. | 707/201 |
| 2008/0244374 A1* | 10/2008 | Hattori | 715/202 |
| 2008/0275922 A1* | 11/2008 | Hertzfeld | 715/765 |
| 2008/0285892 A1* | 11/2008 | Sposato et al. | 382/311 |
| 2009/0055755 A1* | 2/2009 | Hicks et al. | 715/760 |
| 2009/0146961 A1* | 6/2009 | Cheung et al. | 345/172 |
| 2010/0086234 A1* | 4/2010 | Massena et al. | 382/311 |

OTHER PUBLICATIONS

Jeff Carlson, "Quick Guide to Editing Photos in Photoshop Express Beta", Jul. 4, 2008, Peachpit, pp. 3.*

* cited by examiner

*Primary Examiner* — Chau Nguyen
(74) *Attorney, Agent, or Firm* — Kilpatrick Townsend & Stockton LLP (57) ABSTRACT

Non-destructive manipulation of images in a web development environment (WDE) is disclosed. The WDE provides an image preview component for operating on the original source image data of an image desired for placement on a web page under development in the WDE. Image manipulation tools, such as cropping and scaling, are provided in the image preview component allowing the designer to adjust the appearance of the original source image data that will be presented by the web image object placed on the design canvas of the WDE. The web image objects are defined having a link to the original source image data by maintaining the display modification instructions used to manipulate the original image defined by the original source image data into the display of the web image object.

19 Claims, 11 Drawing Sheets

NON-DESTRUCTIVE MANIPULATION OF IMAGES IN WEB DEVELOPMENT ENVIRONMENTS

TECHNICAL FIELD

The present disclosure is directed, in general, to web development environments, and, more particularly, to non-destructive manipulation of web images.

BACKGROUND

From its simple beginnings as a broad network for exchanging information among scientists and researchers, the Internet and World Wide Web (Web) have grown into an integral and essential part of various aspects of personal and business existence. Advancing technology has helped transform the Internet from simple text based information, to a vast array of rich visual and interactive user experiences. In order to create this visual content, designers and developers use a variety of software tools.

In a typical workflow for web designers, the images, which will eventually be displayed in web content, are designed using specialized graphical development environments, such as Adobe Systems Incorporated's PHOTOSHOP® and FIREWORKS®, and the like. The resulting images are typically stored to a compression format such as PHOTOSHOP® Document (PSD), Portable Network Graphics (PNG), Graphics Interchange Format (GIF), a low-compression Joint Photographic Experts Group (JPEG), or the like. These original source graphics files are intended to maintain a great amount of detail for the designed images. Therefore, because of bandwidth restrictions and guidelines for adequate loading times, these original source files are impractical for use directly in the code defining the web page or web application. Typically, web designers will use the original source files to create web images in a format that is more compatible with web display, such as higher compression JPEGs, GIFs, or the like. Using web-optimized file formats helps to maintain efficient loading of the web images onto the users' browser windows.

Another technique generally used by web designers is to take only a portion of the original source file for an image and create some modified version of that image for the web file. For example, the original image source file may contain an image of an automobile. However, the web designer only wants an image of a license plate on a bumper for the web page under design. In order to generate this web image, the designer would convert the original source file into a web-optimized file format and insert this web image onto the design view of a web development environment (WDE), such as Adobe Systems Incorporated's DREAMWEAVER® and GOLIVE®, Microsoft Corporation's FRONT PAGE®, or the like. Many WDEs provide a dialog window that opens the original source file of the image and presents a number of options to the designer to select to determine how the designer would like the source file to be processed into the web image file. For example, the dialog may allow the designer to select the compression format, the type of compression, and possibly any filtering that the designer would like to use. When the designer is satisfied with his or her selections, he or she will select to insert the image file into the web page under development. This selection to insert would execute a conversion component to generate a new image file for the web image by converting the original source image file according to the designer's selections.

The image will then be displayed by the WDE on the design canvas and associated with a new web image file in the selected format. By working in the design view of the WDE, the designer may then apply a cropping feature to the web image which cuts out and deletes those portions of the larger image that the designer does not wish to use. In a typical crop operation, the user places a crop rectangle (a "crop rect") onto the image and moves or shapes the crop rect to surround the area of the image that the designer wishes to keep. Upon executing the crop function, the WDE deletes all image data outside of the perimeter of the user-positionable crop rect and resaves the file representing the web image which now only includes the data from inside the crop rect. The cropped web image can now be manipulated further as the designer wishes.

As with other design endeavors, the designer may make a mistake with the cropped web image or may change his or her mind with regard to how the image has been modified or the amount of the original image that he or she desires to use in the resulting web page. For instance, maybe the designer would rather use an image of the license plate on an automobile that includes the image of the auto's headlamp, or, perhaps, the designer may not be satisfied with a particular result of a filter that has been used on the web image data. Because the WDE operates directly on the web image file, the designer typically is forced to delete the web image completely and start over from the original source file. While this restarting process may not be that inconvenient to the designer if the designer only needs to restart a few times, if the designer is making detailed modifications or applying complex filters to the web image, he or she may need to restart often in order to obtain just the desired effect. This restarting process, then, can be quite inconvenient and cost a great deal of design time, which costs the designer money and efficiency.

BRIEF SUMMARY

The present teaching is directed to providing non-destructive manipulation of images in a web development environment (WDE). The WDE provides an image preview component for operating on the original source image data of an image desired for placement on a web page under development in the WDE. Image manipulation tools, such as cropping and scaling, are provided in the image preview component allowing the designer to adjust the appearance of the original source image data that will be presented by the web image object placed on the design canvas of the WDE. The web image objects have a link to the original source image data by maintaining the display modification instructions used to manipulate the original image defined by the original source image data into the display of the web image object.

Representative embodiments of the present teachings are directed to methods that include displaying an image preview dialog configured to present a source image representative of a web image object on a design canvas, detecting modification actions providing modification instructions for modifying the display of the source image, and, responsive to detecting a placement action, creating a modified web image object from the source image and replacing the web image object with the modified web image object on the design canvas rendered according to the modification instructions.

Additional representative embodiments of the present teachings are directed to systems that include a memory coupled to a processor, an image preview component stored in the memory, where the image preview component is configured to display a source image and provide image modification tools for modifying the display of the source image. The computer program product further includes a design view component stored in the memory, where the design view component is configured to display a web image associated with the source image and provide editing tools for editing the display of the web image, and a conversion component stored in the memory, where the conversion component is configured to convert the source image into the web image and compile a set of modification instructions associated with the modifying and the editing.

Further representative embodiments of the present teachings are directed to computer program products having a computer readable medium with computer program logic recorded thereon. The computer program product includes code for displaying an image preview dialog configured to present a source image representative of a web image object on a design canvas, code for detecting modification actions providing modification instructions for modifying display of the source image, and responsive to detecting a placement action, code for creating a modified web image object from the source image, and code for replacing the web image object with the modified web image object on the design canvas rendered according to the modification instructions.

The foregoing has outlined rather broadly the features and technical advantages of the present teachings in order that the detailed description of the disclosure that follows may be better understood. Additional features and advantages of the teachings will be described hereinafter which form the subject of the claims. It should be appreciated by those skilled in the art that the conception and specific embodiment disclosed may be readily utilized as a basis for modifying or designing other structures for carrying out the same purposes of the present teachings. It should also be realized by those skilled in the art that such equivalent constructions do not depart from the spirit and scope of the teachings as set forth in the appended claims. The novel features which are believed to be characteristic of the present teaching, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present teachings, reference is now made to the following descriptions taken in conjunction with the accompanying drawing, in which.

DETAILED DESCRIPTION

One feature that has been developed in graphical development environments that connects the source image file to additional instances of the image is the source-linked image layer. A source-linked image layer is an image layer that contains a link to the original source data of the image. Various adjustment layers may be added to change the display characteristic of the image. However, the original source data remains unchanged and the designer may recapture the original data when changes to the image are desired. Additionally, the designer may make changes to the original source data and have those changes propagated through each of the other instances of the image within the design canvas. An example of a source-linked image layer is the Smart Object feature found in PHOTOSHOP® and FIREWORKS®.

The source-linked image layer feature has been added to previous WDEs, such as GOLIVE®, but the WDEs still operate directly on the web image files. Therefore, destructive manipulations, such as cropping, destroy the linking between the web image data and the original source data in these WDEs.

Figure 1:
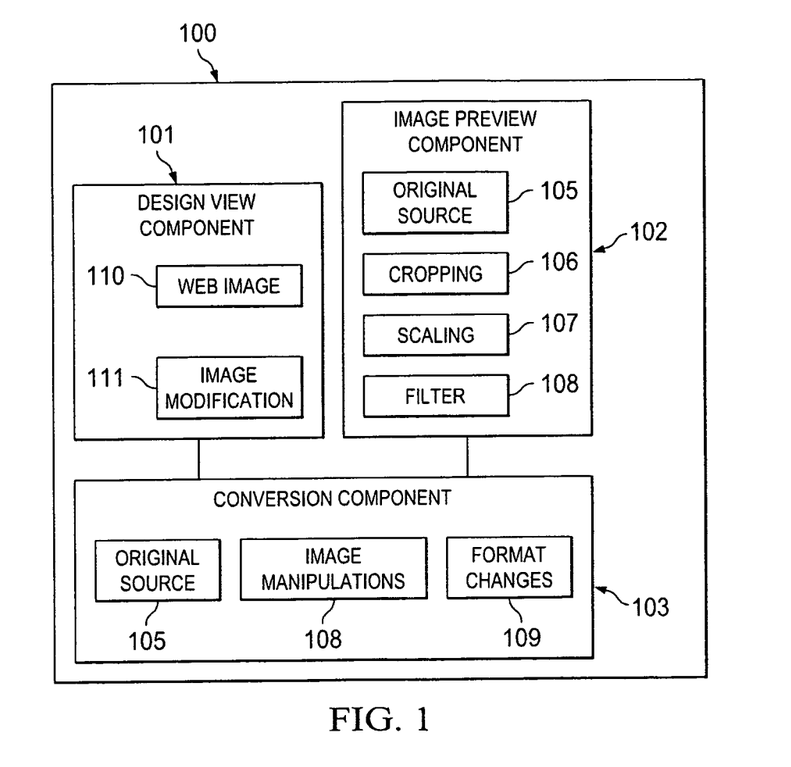
FIG. 1 is a block diagram illustrating a WDE configured according to one embodiment of the present teachings.

FIG. 1 is a block diagram illustrating WDE 100 configured according to one embodiment of the present teachings. With respect to implementing the described embodiment, WDE 100 includes design view component 101 image preview component 102, and conversion component 103. WDE 100 includes numerous other well known components that are not shown which are typical for features of WDEs. Design view component 101 provides the code that presents the visual design canvas to a web designer. The web designer may then graphically manipulate various objects, images, and the like, of the web page under design. Image preview component 102 provides specific image-related information and features associated with the web images displayed in the design canvas operated by design view component 101. Image preview component 102 uses original source data 105 for its presentations and manipulation of the associated image.

Unlike previous WDEs, however, WDE 100 includes image modification tools within image preview component 102, instead of placing these features solely within design view component 101. For example, image preview component 102 includes cropping feature 106, scaling feature 107, and filter feature 108. When the designer views an image object from the design canvas of design view component 101 from within image preview component 102, the designer views original source 105 that may have been modified to some degree by any of features 106-108. Moreover, the designer may manipulate the image further through modification actions using features 106-108. When these manipulation actions are detected, however, they will take the form of image manipulation instructions to original source 105. Thus, the image data of original source data 105 remains unchanged, with only the presentation of that image data modified by the image manipulation instructions providing the visual changes.

In order to make these image manipulations non-destructive, the resulting web image presentation, web image 110, that will be displayed by design view component 101 is generated by conversion component 103, which takes original source data 105, uses the instructions from image manipulations 108 taken from the designer's selections of various of features 106-108, and then uses format change 109 to provide web image 110 that will be displayed in the design canvas in the appropriate web-compatible format. The designer may also edit web image 110 further from within the design canvas through image modification 111. Those modifications occur on top of the underlying presentation of web image 110, such that the modifications provide instructions for changing the appearance of web image 110. Image modification 111 represents any and all image manipulation features typically available in WDEs. If the designer desires to change the resulting image presentation, instead of deleting web image 110 and starting again from original source data 105, the designer selects to open web image 110 with image preview component 102. Conversion component 103 essentially passes image manipulations 108 back to image preview component 102. Image preview component 102 uses image manipulations, which may have been modified through image modifications 111, to present the image using original source data 105.

It should be noted that image preview component 102 may be implemented through various means, including the sharing of libraries, code, or other components with graphics development environments. For example, a library included in a graphics development environment that includes features that operate on original source data may be included in a WDE. Thus, as actions are taken on the source data within image preview component 102, the features from the graphics development environment library may be used, while when providing web image 110 to design view component 101, conversion component 103 operates to facilitate the exchange of the data between the graphics development environment library and the WDE library.

Figure 2A:
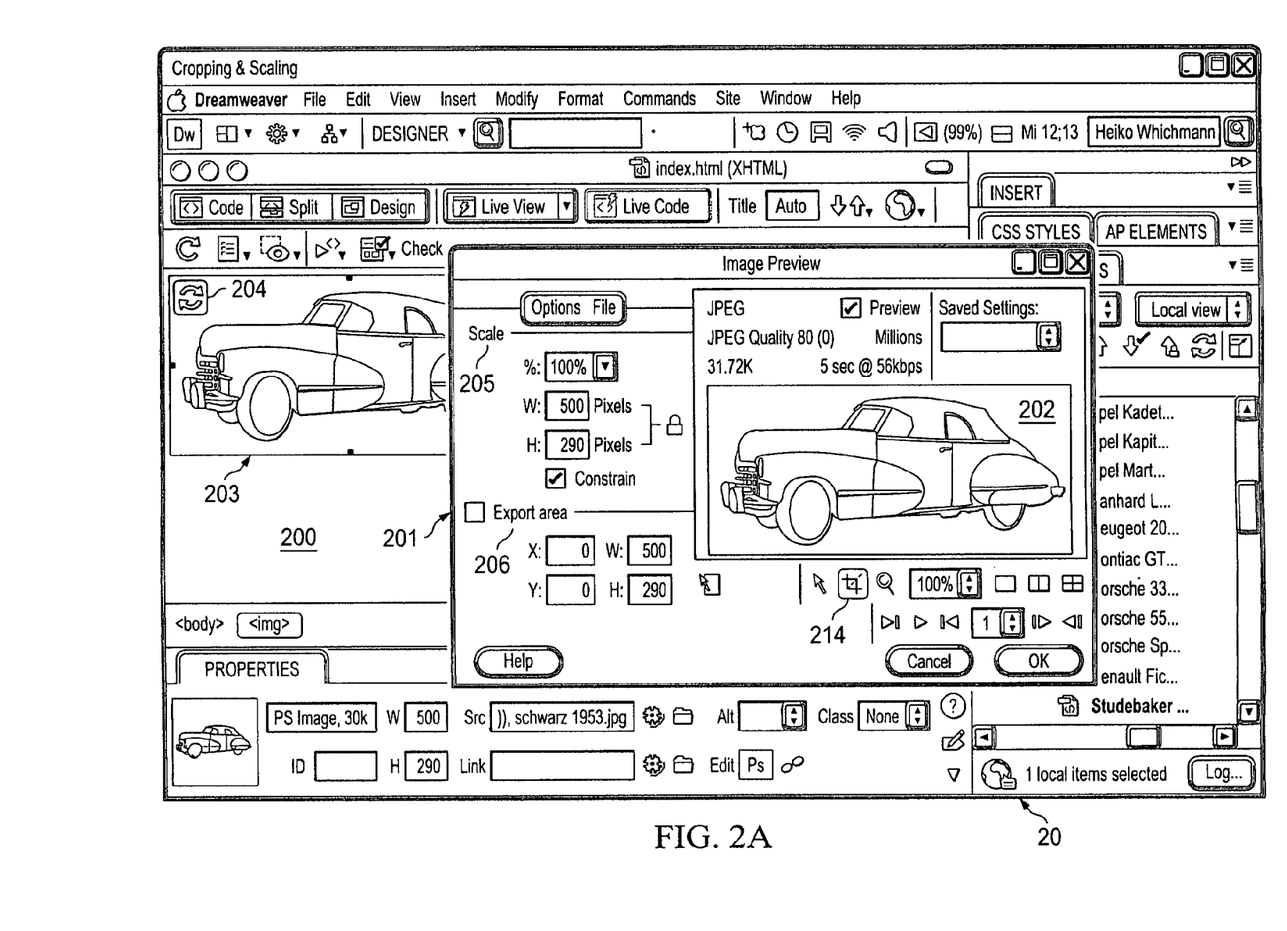
FIGS. 2A-H are screen shots illustrating a WDE configured according to one embodiment of the present teachings.

FIGS. 2A-H are screen shots illustrating WDE 20 configured according to one embodiment of the present teachings. WDE 20 presents web image object 203 on design canvas 200, as illustrated in FIG. 2A. Web image object 203 is configured in a web-compatible format. However, badge 204 displayed on web image object 203 signifies that web image object 203 is a source-linked object. As the designer decides to modify the display of web image object 203, the designer selects to open image preview dialog 201. Image preview dialog 201 displays source image file 202, which represents the source of web image object 203. Image preview dialog 201 presents a variety of options and selections that the designer may make to modify or manipulate the resulting presentation of source image file 202 in web image object 203. For example, the designer may scale source image file 202 by entering scale parameters in scale interface 205, or the designer may provide a crop rect for exporting only a portion of source image file 202 by entering crop parameters in export interface 206 or crop button 214.

Figure 2B:
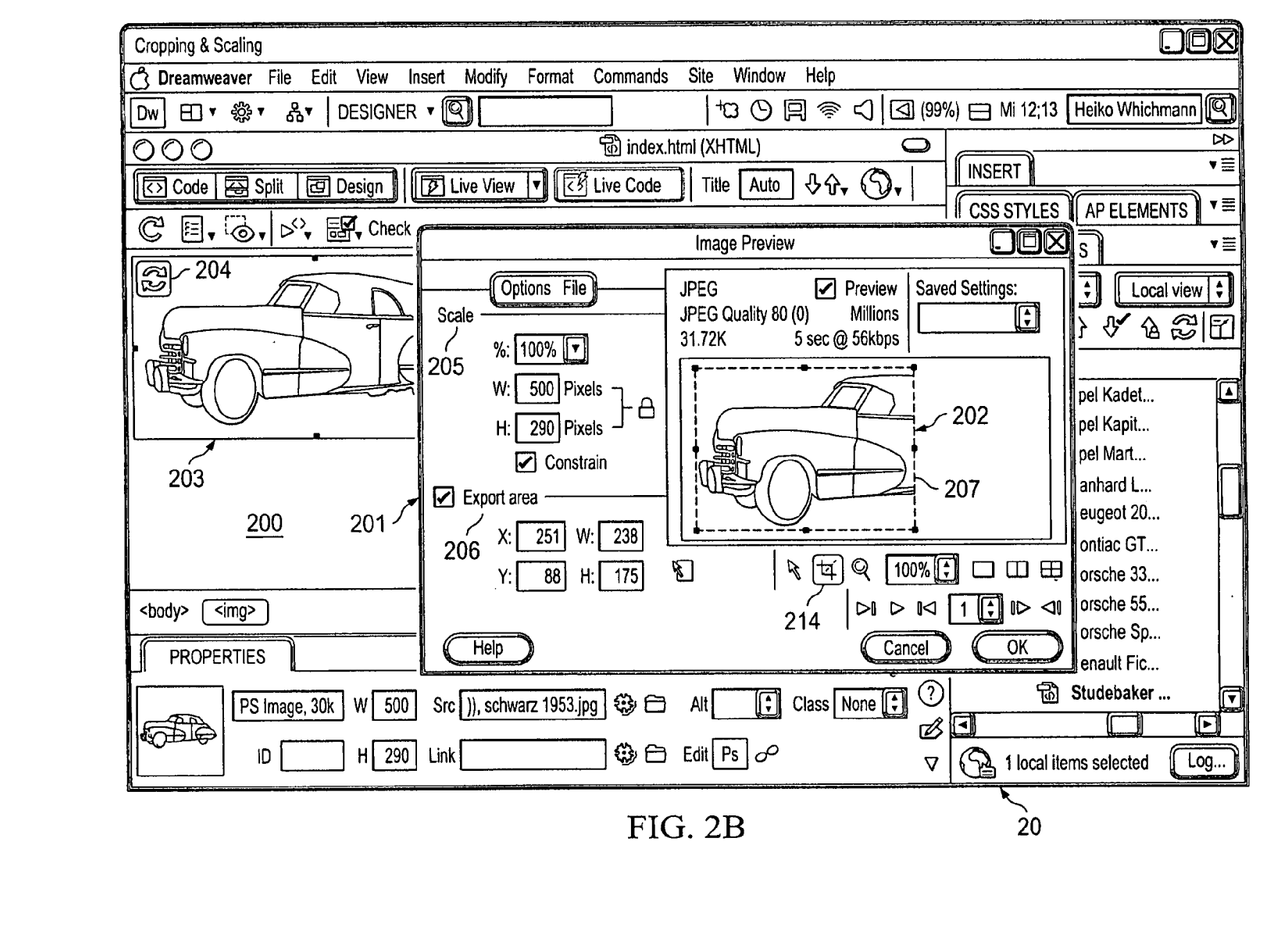
Figure 2C:
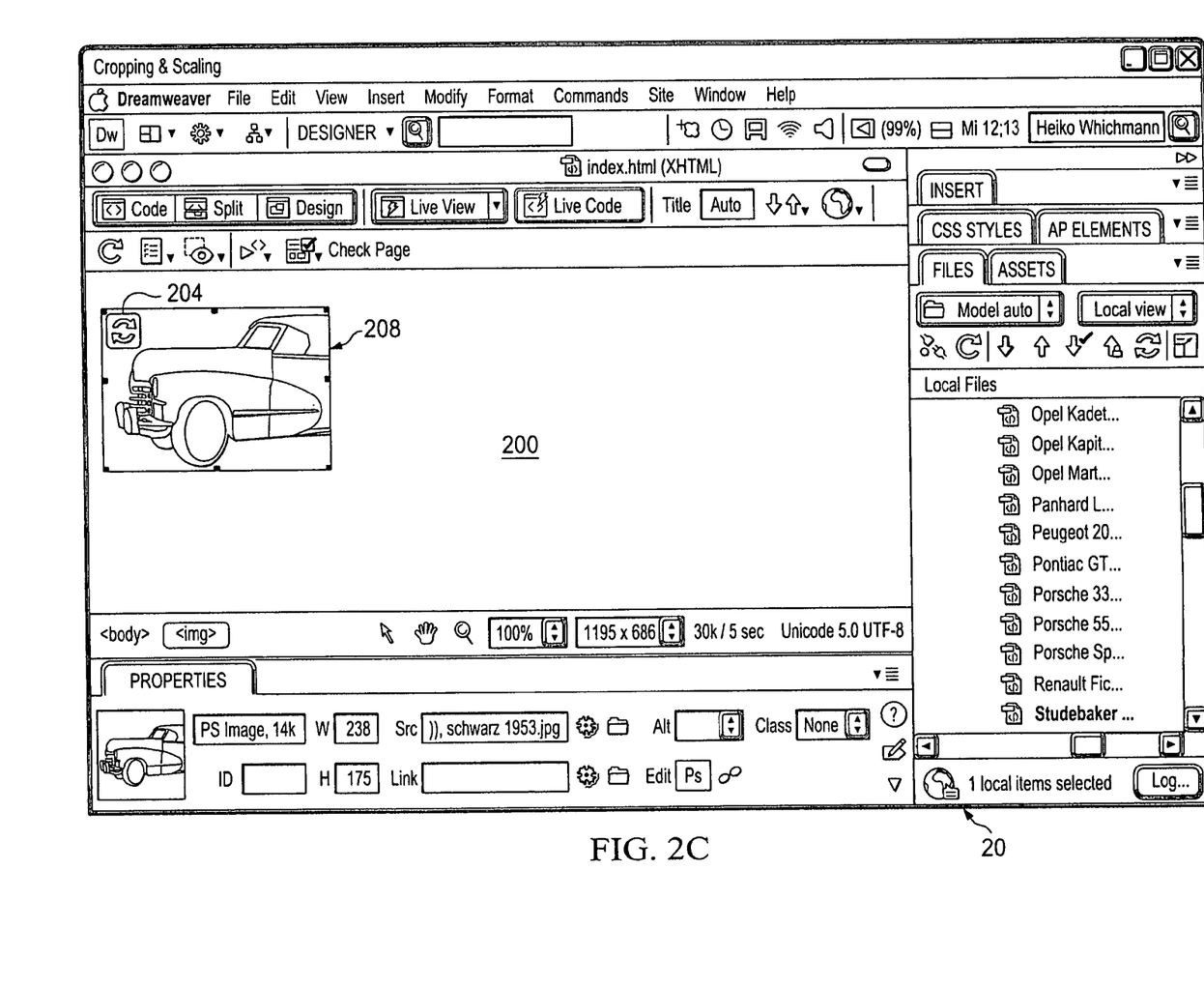

The designer selects to crop source image file 202 and export only a portion of the image for web image object 203. Crop rect 207 is displayed on image preview dialog 201, as shown on FIG. 2B, allowing the designer to position crop rect 207 to highlight only that area of source image file 202 that he or she desires to export. Responsive to the crop selection, export interface 207 is checked and the coordinates of the selection defined by crop rect 207 are displayed, in addition to crop button 214 shown as selected. When the designer has positioned crop rect 207 in the desired location he or she selects to export the image to design canvas 200, as illustrated in FIG. 2C. Modified web image object 208 is now displayed on design canvas 200. Modified web image object 208 displays the portion of source image file 202 (FIG. 2B) that was designated by crop rect 207 (FIG. 2B). As the designer triggers a placement signal, in image preview dialog 201, the modified version of source image file 202, WDE 20 uses the modification instructions from crop rect 207 to modify the presentation of the image and convert the format of that presentation to a web compatible file format for modified web image object 208. Image preview dialog 201 is then removed from the interface.

Figure 2D:
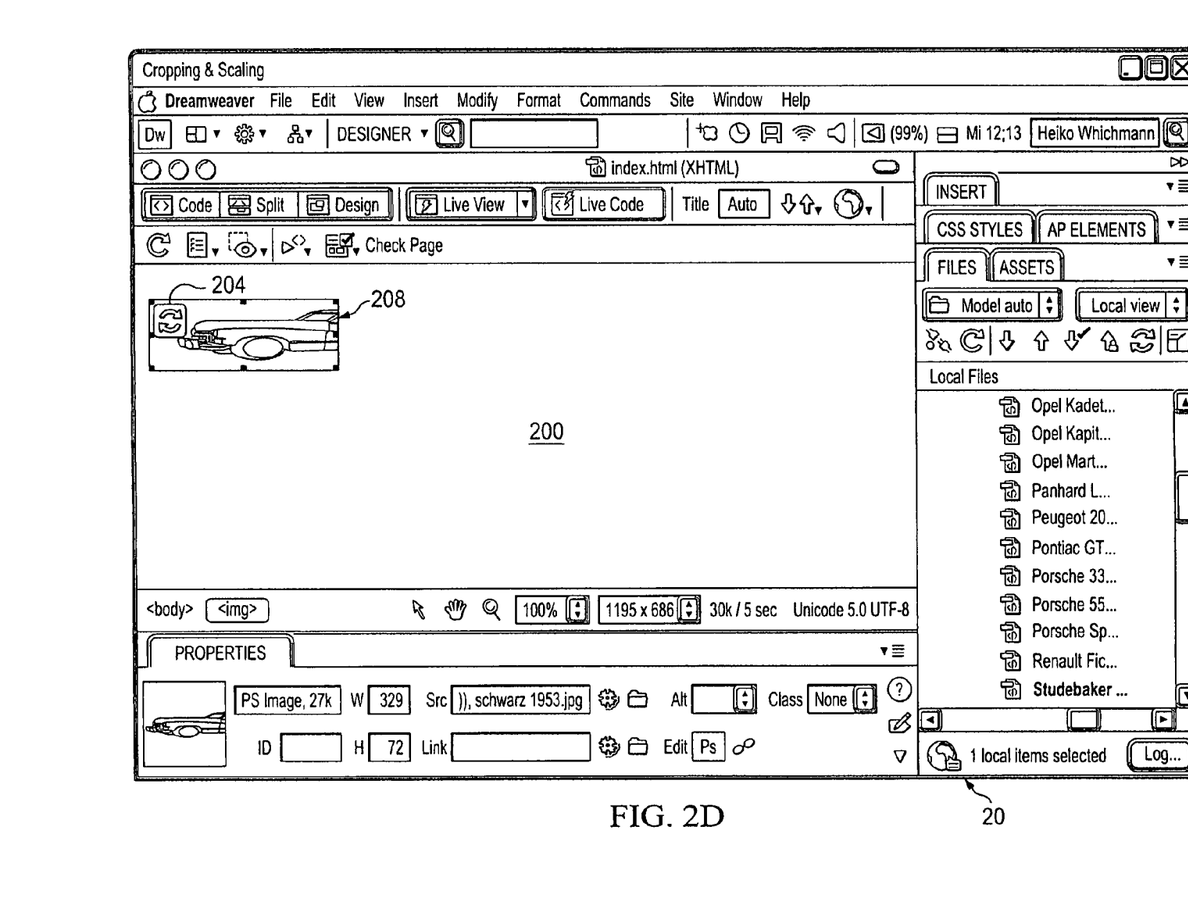
Figure 2E:
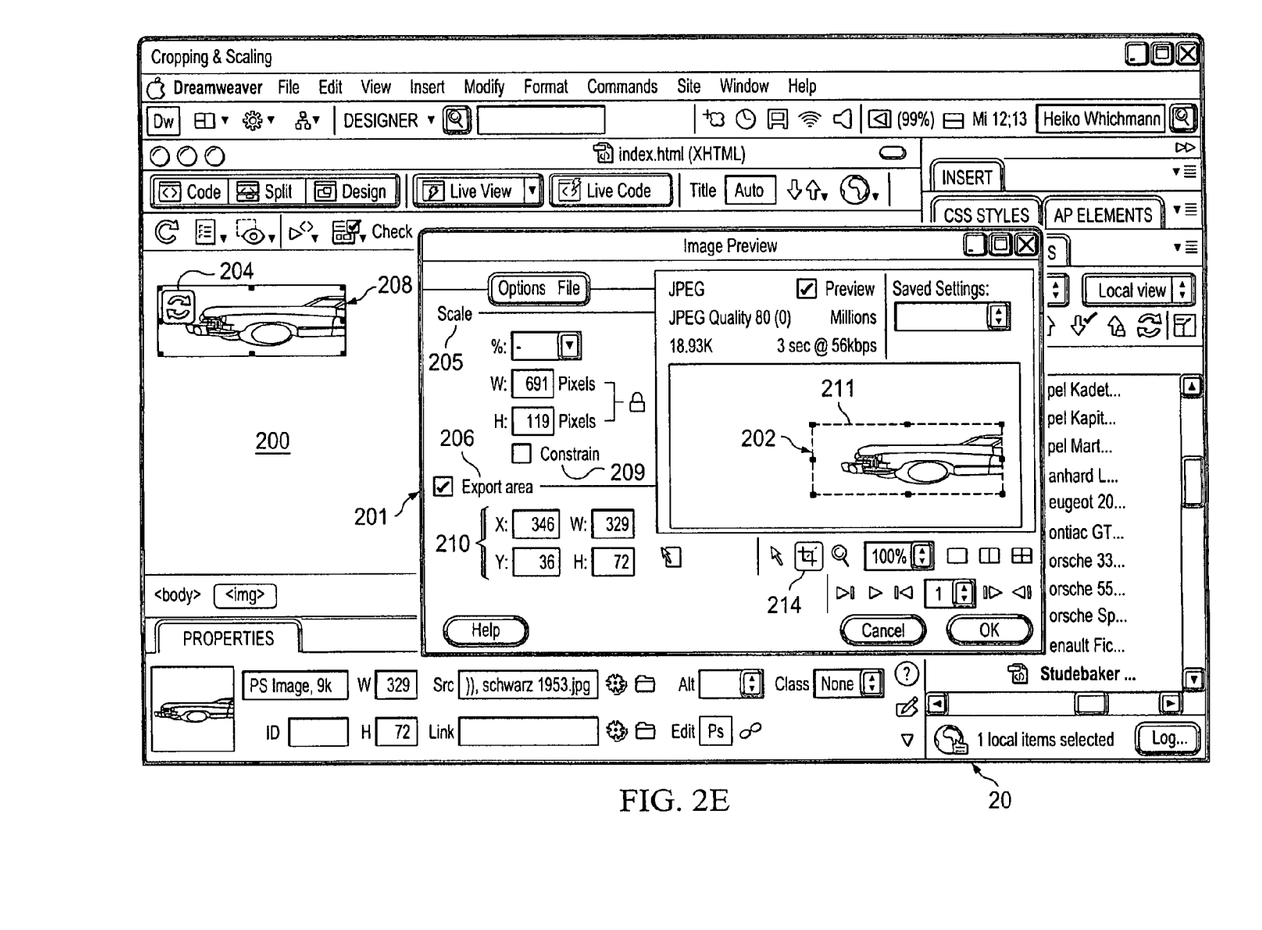

Once modified web image object 208 is in place on design canvas 200, the designer may select an editing tool or use any other available properties to adjust the appearance of modified web image object 208. As illustrated in FIG. 2D, when the designer's editing the hypertext markup language (HTML) dimensions of modified web image object 208 is detected, the appearance of modified web image object 208 is stretched horizontally and compressed vertically. In existing WDEs, once some modification of modified web image object 208 is made within design canvas 200, the modification destroys any relationship to source image file 202 because those edits are actually made to the web image. In contrast, the edits detected in WDE 20 only provide additional modification instructions that instruct WDE 20 how to modify the display of the web image. If, thereafter, the designer using WDE 20 desires to change the underlying presentation of modified web image object 208, he or she may select to reopen the image in image preview dialog 201, as illustrated in FIG. 2E.

When image preview dialog 201 is opened, WDE 20 compiles the image manipulations of modified web image object 208, which are the set of rendering instructions that makes the image defined by source image file 202 appear on design canvas 200 as modified web image object 208. Because image preview dialog 201 works with source image file 202, image preview dialog 201 uses the image manipulations to modify the appearance of source image file 202 within crop rect 211. Image preview dialog 201 displays the new coordinates of crop rect 211 at export parameter interface 210.

Figure 2F:
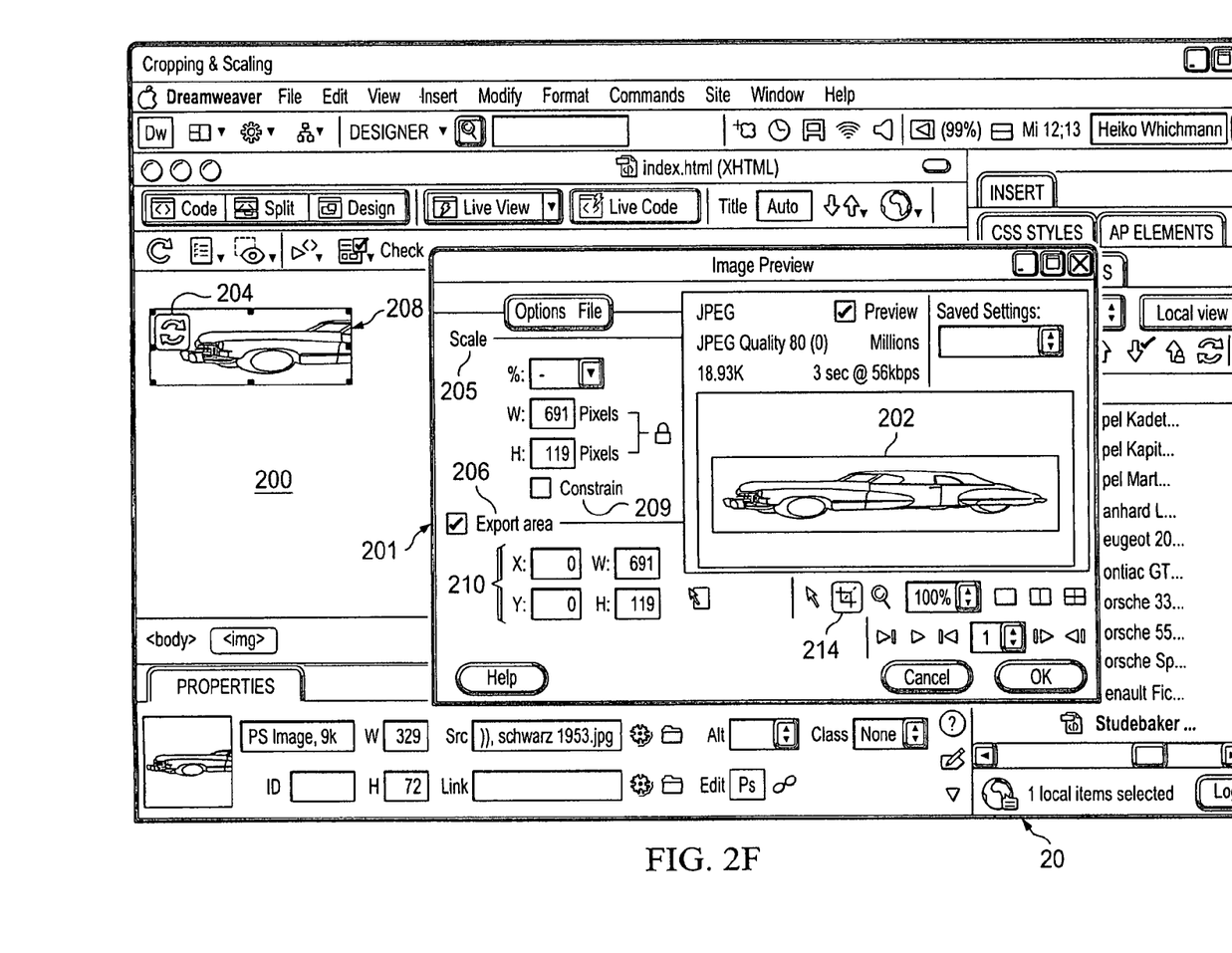

Because the constraints of crop rect 211 are first applied within image preview dialog 201 and associated with source image file 202 before being placed in design canvas 200 as a web image, the original data of source image file 202 is preserved. As the designer deselects export interface 206, as illustrated in FIG. 2F, crop rect 211 (FIG. 2E) is removed from image preview dialogy 201, thus, withdrawing the modification instructions associated with the crop rect, revealing the entire image of source image file 202. Export parameter interface 210 also illustrates this removal by zeroing out the X and Y coordinates. Thus, none of the cropping to the image implemented by crop rect 207 or crop rect 211 on source image file 202 has destroyed any of the image data in source image file 202. Source image file 202 is still modified in its display because of the image manipulations made when the designer changed the HTML dimensions of modified web image object 208.

Figure 2G:
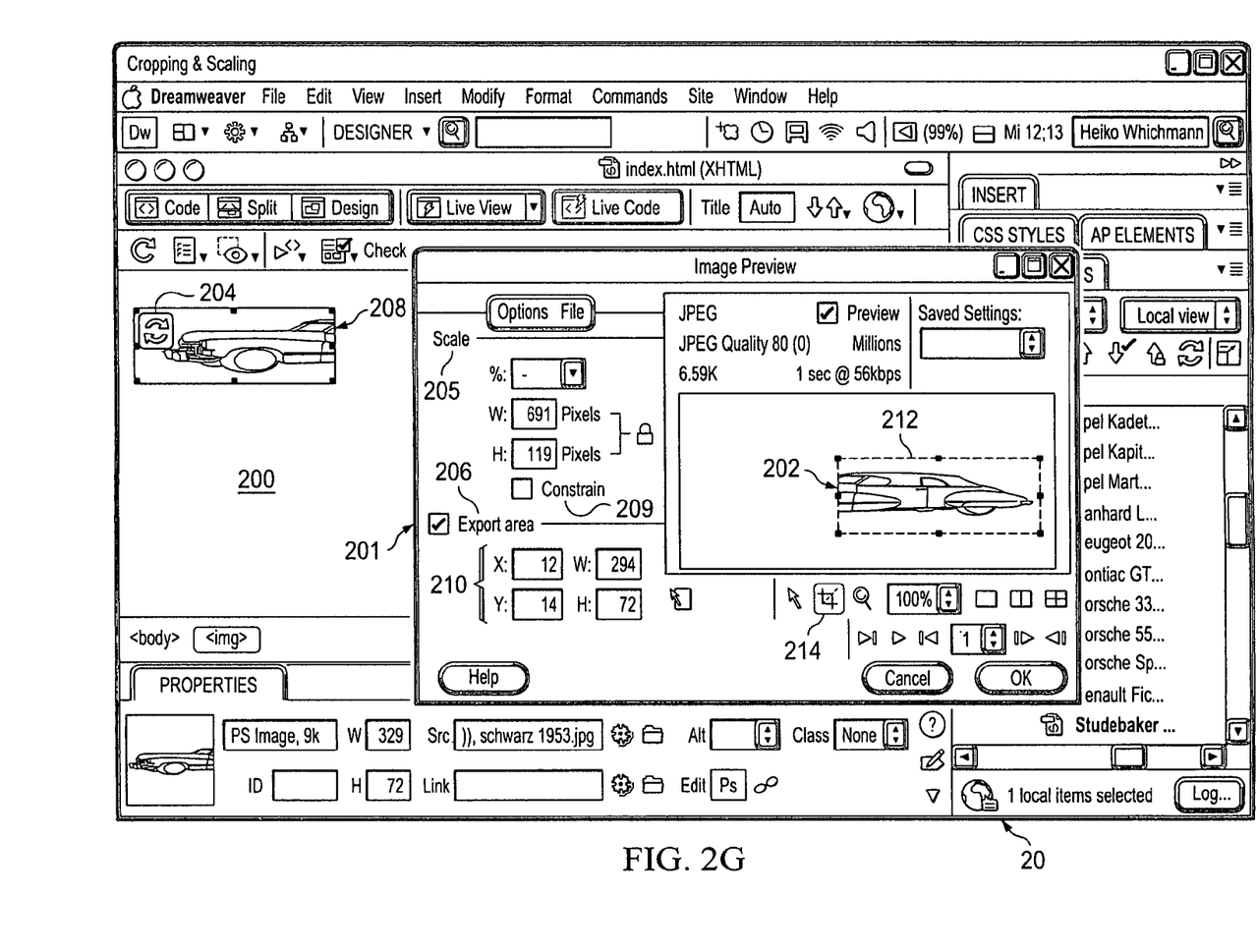
Figure 2H:
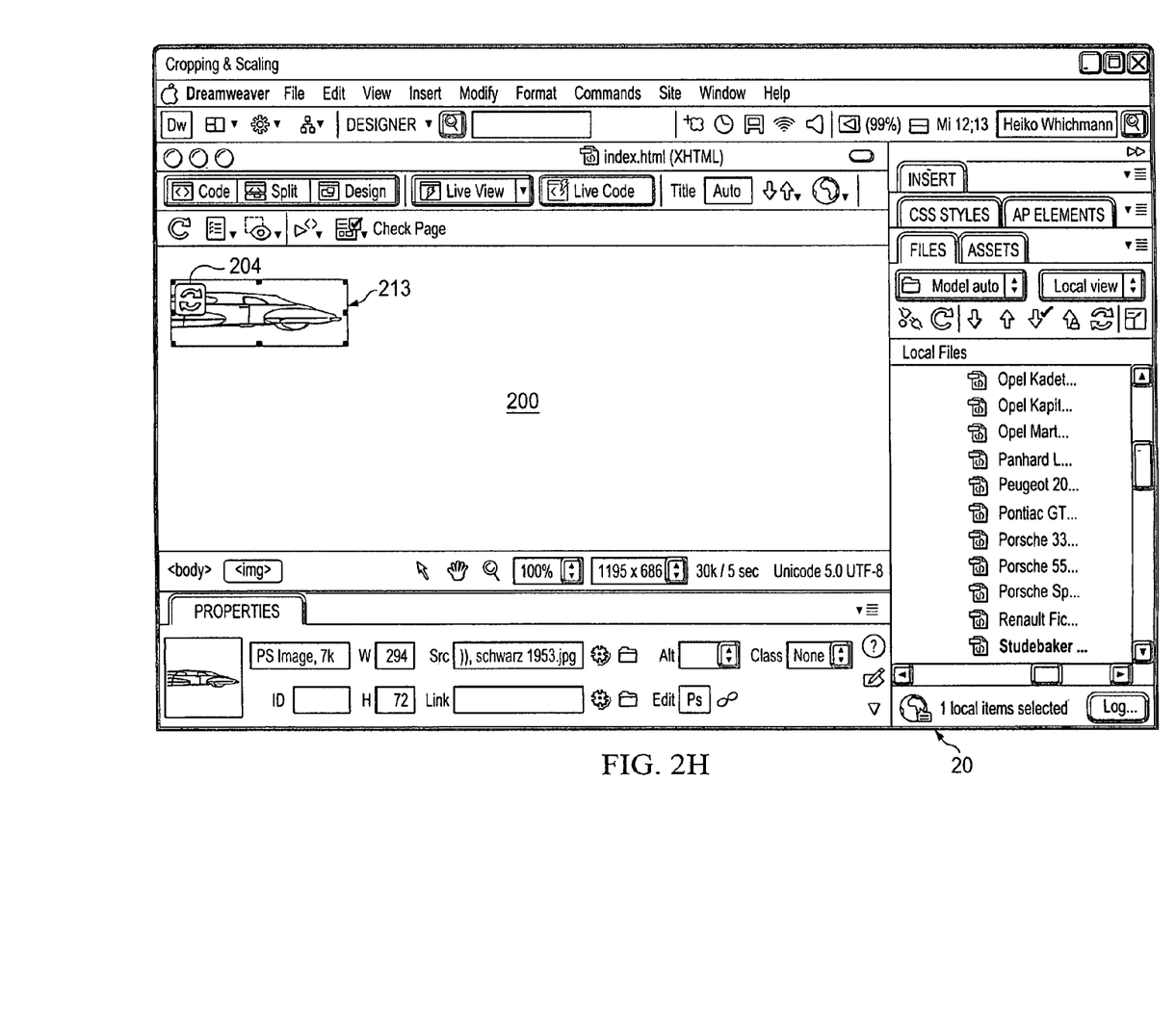

The designer determines that the web page under development would look better if the back end of the automobile pictured in source image file 202 is presented. The designer re-selects export interface 206 which places crop rect 212 onto image preview dialog 201, as illustrated in FIG. 2G. The designer manipulates crop rect 212 to reveal only the portion of source image file 202 representing the back end of the automobile. Upon selecting to place the image represented by the cropped source image file 202, new web image object 213 is placed in design canvas 200. Thus, not only has the designer changed the underlying image, but the modifications made to modified web image object 208 by the designer operating within design canvas 200 have been preserved and applied to the new, underlying image.

Figure 3:
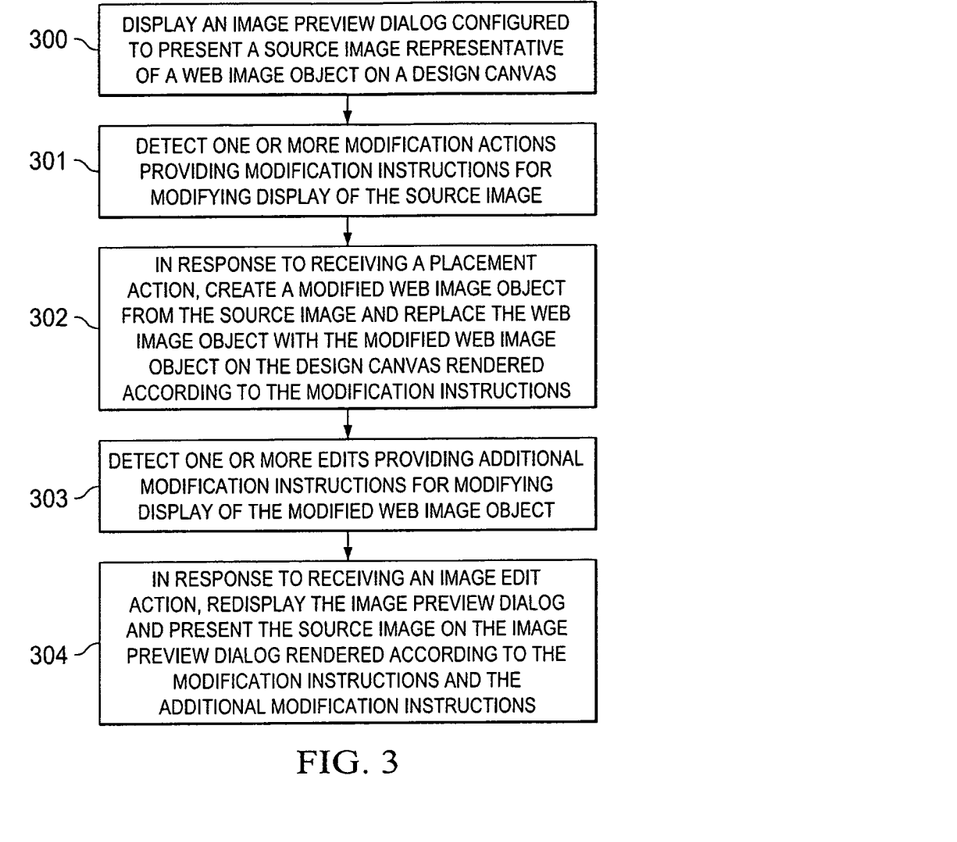
FIG. 3 is a flowchart illustrating example steps executed to implement one embodiment of the present teachings.

FIG. 3 is a flowchart illustrating example steps executed to implement one embodiment of the present teachings. In step 300, an image preview dialog is displayed in a WDE, in which the display is configured to present a source image representative of a web image object on a design canvas of the WDE. One or more image modification tools is provided in the image preview dialog, in step 301, wherein the image modification tools provides modification instructions for modifying display of the source image. In response to receiving a placement signal in step 302, a modified web image object is created in a web format from the source image, the web image object is replaced with the modified web image object on the design canvas rendered according to the modification instructions, and the image preview dialog is removed from display. One or more editing tools are provided for the design canvas, in step 303, wherein the editing tools provide additional modification instructions for modifying display of the modified web image object on the design canvas. In response to receiving an image edit signal in step 304, redisplay the image preview dialog and present the source image on the image preview dialog rendered according to the modification instructions and the additional modification instructions.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 4:
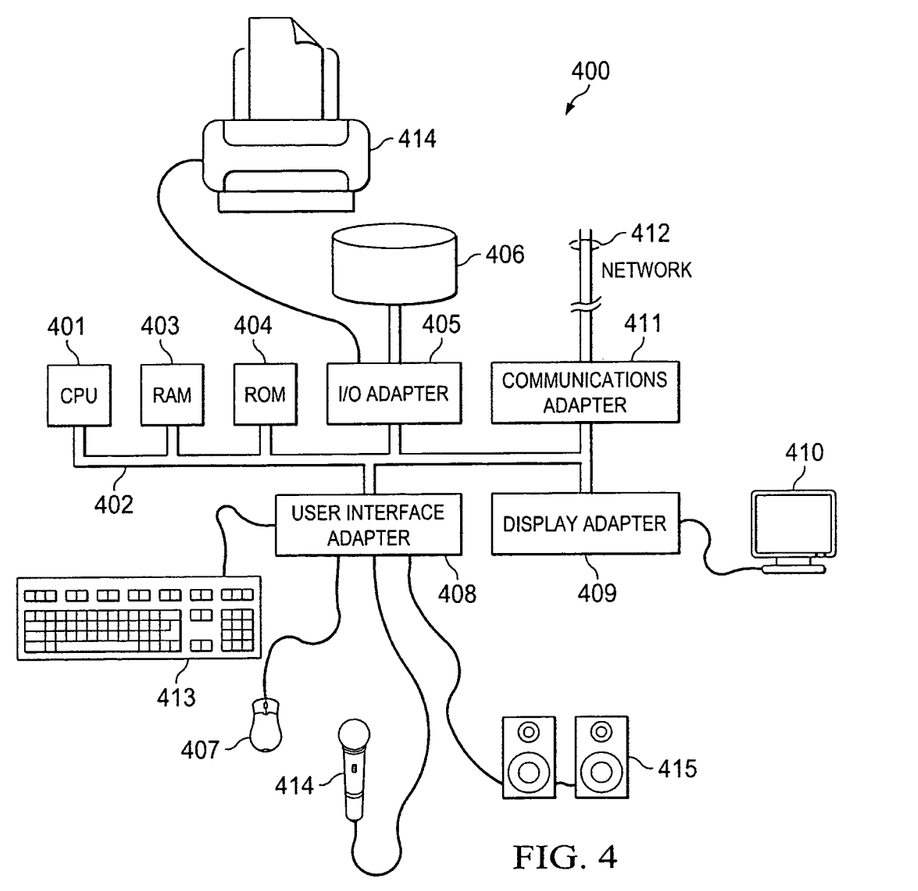
FIG. 4 illustrates an exemplary computer system which may be employed to implement the web development environment according to certain embodiments of the teachings herein.

FIG. 4 illustrates an exemplary computer system 400 which may be employed to implement the web development environment according to certain embodiments. Central processing unit (CPU) 401 is coupled to system bus 402. CPU 401 may be any general-purpose CPU. The present disclosure is not restricted by the architecture of CPU 401 (or other components of exemplary system 400) as long as CPU 401 (and other components of system 400) supports the inventive operations as described herein. CPU 401 may execute the various logical instructions described herein. For example, CPU 401 may execute machine-level instructions according to the exemplary operational flow described above in conjunction with FIG. 3.

Computer system 400 also includes random access memory (RAM) 403, which may be SRAM, DRAM, SDRAM, or the like. Computer system 400 includes read-only memory (ROM) 404 which may be PROM, EPROM, EEPROM, or the like. RAM 403 and ROM 404 hold user and system data and programs, as is well known in the art.

Computer system 400 also includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information, such as interacting with the user interface of the web development environments, as described above.

I/O adapter 405 connects to storage device(s) 406, such as one or more of hard drive, compact disc (CD) drive, floppy disk drive, tape drive, etc., to computer system 400. Communications adapter 411 is adapted to couple computer system 400 to network 412, which may enable information to be input to and/or output from system 400 via such network 412 (e.g., the Internet or other wide-area network, a local-area network, a public or private switched telephony network, a wireless network, any combination of the foregoing). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display the web development environment, web and source images, as discussed herein.

It shall be appreciated that the present disclosure is not limited to the architecture of system 400. For example, any suitable processor-based device may be utilized for implementing the web development environments disclosed herein, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present teaching and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present teachings, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    displaying, by a processor, a source image in an image preview interface in response to a first request to display the image preview interface;
    receiving, by the processor, a first modification command, the first modification command specifying a first rendering instruction to be performed in response to a command to display the source image, wherein the first modification command specifies hiding a portion of the source image as displayed in the image preview interface;
    generating, by the processor, a web image object comprising a link to the source image and further comprising the first rendering instruction;
    receiving, by the processor, a second modification command, the second modification command specifying a second rendering instruction to be performed in response to the command to display the source image, wherein the second modification command specifies a change to a non-hidden portion of the source image as displayed with the web image object;

updating, by the processor, the web image object to include the second rendering instruction; and displaying, by the processor, the source image in the image preview interface in response to a second request to display the image preview interface, wherein the source image is displayed in the image preview interface by executing the first and second rendering instructions included in the web image object in response to the second request, wherein displaying the source image in the image preview interface in response to the second request further comprises:

applying the change specified by the second modification command to the portion of the source image hidden by the first modification command, and displaying the portion of the source image in the image preview interface with the applied change specified by the second modification command.

2. The method of claim 1, wherein the first modification command further comprises a cropping command and wherein the first rendering instruction comprises a command to display a first portion of the source image in the image preview interface and to hide a second portion of the source image, wherein the first portion comprises the non-hidden portion and is within boundaries specified by a cropping function window and the second portion comprises the hidden portion and is outside of the boundaries specified by the cropping function window;

wherein the second modification command further comprises a change in a dimension of the first portion as displayed with the web image object; and wherein displaying the portion of the source image in the image preview interface with the applied change specified by the second modification command comprises displaying the second portion of the source image with the change in the dimension specified by the second modification command.

3. The method of claim 2, wherein the second modification command comprises stretching the first portion of the source image as displayed with the web image object and wherein displaying the second portion of the source image with the change in the dimension specified comprises displaying a stretched version of the second portion of the source image in the image preview interface.

4. The method of claim 2, wherein the second modification command comprises shrinking the first portion of the source image as displayed with the web image object and wherein displaying the second portion of the source image with the change in the dimension specified comprises displaying a shrunken version of the second portion of the source image in the image preview interface.

5. The method of claim 1, wherein the first and second rendering instructions are executed without modifying the source image from which a displayed version of the web image object is generated.

6. The method of claim 5, wherein displaying the source image in the image preview interface in response to the second request to display the image preview interface comprises retrieving the unmodified source image.

7. The method of claim 6, wherein displaying the source image in the image preview interface in response to the second request further comprises selecting a portion of the unmodified source image to display in the image preview interface based on the first and second rendering instructions.

8. The method of claim 1, wherein the first modification is received with respect to the source image via the image preview interface and the second modification command is received with respect to the web image object via an additional interface different from the image preview interface.

9. A system comprising:

a processor communicatively coupled to a non-transitory computer-readable medium and programmable by executable code stored on the non-transitory computer-readable medium to perform operations comprising:

displaying a source image in an image preview interface in response to a first request to display the image preview interface, receiving a first modification command, the first modification command specifying a first rendering instruction to be performed in response to a command to display the source image, wherein the first modification command specifies hiding a portion of the source image as displayed in the image preview interface, generating a web image object comprising a link to the source image and further comprising the first rendering instruction, receiving a second modification command, the second modification command specifying a second rendering instruction to be performed in response to the command to display the source image, wherein the second modification command specifies a change to a non-hidden portion of the source image as displayed with the web image object, updating the web image object to include the second rendering instruction, and displaying the source image in the image preview interface in response to a second request to display the image preview interface, wherein the source image is displayed in the image preview interface by executing the first and second rendering instructions included in the web image object in response to the second request, wherein displaying the source image in the image preview interface in response to the second request further comprises:

applying the change specified by the second modification command to the portion of the source image hidden by the first modification command, and displaying the portion of the source image in the image preview interface with the applied change specified by the second modification command.

10. The system of claim 9, wherein the first modification command further comprises a cropping command and wherein the first rendering instruction comprises a command to display a first portion of the source image in the image preview interface and to hide a second portion of the source image, wherein the first portion comprises the non-hidden portion and is within boundaries specified by a cropping function window and the second portion comprises the hidden portion and is outside of the boundaries specified by the cropping function window;

wherein the second modification command comprises a change in a dimension of the first portion as displayed with the web image object; and wherein displaying the portion of the source image in the image preview interface with the applied change specified by the second modification command comprises displaying the second portion of the source image with the change in the dimension specified by the second modification command.

11. The system of claim 10, wherein the second modification command comprises stretching the first portion of the source image as displayed with the web image object and wherein displaying the second portion of the source image with the change in the dimension specified comprises displaying a stretched version of the second portion of the source image in the image preview interface.

12. The system of claim 10, wherein the second modification command comprises shrinking the first portion of the source image as displayed with the web image object and wherein displaying the second portion of the source image with the change in the dimension specified comprises displaying a shrunken version of the second portion of the source image in the image preview interface.

13. The system of claim 9, wherein the first and second rendering instructions are executed without modifying the source image from which a displayed version of the web image object is generated.

14. The system of claim 13, wherein displaying the source image in the image preview interface in response to the second request to display the image preview interface comprises retrieving the unmodified source image.

15. The system of claim 14, wherein displaying the source image in the image preview interface in response to the second request further comprises selecting a portion of the unmodified source image to display in the image preview interface based on the first and second rendering instructions.

16. The system of claim 9, wherein the first modification is received with respect to the source image via the image preview interface and the second modification command is received with respect to the web image object via an additional interface different from the image preview interface.

17. A non-transitory computer-readable medium storing code executable by a processor, the code comprising:
    code for displaying a source image in an image preview interface in response to a first request to display the image preview interface;
    code for receiving a first modification command, the first modification command specifying a first rendering instruction to be performed in response to a command to display the source image, wherein the first modification command specifies hiding a portion of the source image as displayed in the image preview interface;
    code for generating a web image object comprising a link to the source image and further comprising the first rendering instruction;
    code for receiving a second modification command, the second modification command specifying a second rendering instruction to be performed in response to the command to display the source image, wherein the second modification command specifies a change to a non-hidden portion of the source image as displayed with the web image object;
    code for updating the web image object to include the second rendering instruction; and
    code for displaying the source image in the image preview interface in response to a second request to display the image preview interface, wherein the source image is displayed in the image preview interface by executing the first and second rendering instructions included in the web image object in response to the second request, wherein displaying the source image in the image preview interface in response to the second request further comprises:
        applying the change specified by the second modification command to the portion of the source image hidden by the first modification command, and
        displaying the portion of the source image in the image preview interface with the applied change specified by the second modification command.

18. The non-transitory computer-readable medium of claim 17, wherein the first and second rendering instructions are executed without modifying the source image from which a displayed version of the web image object is generated.

19. The non-transitory computer-readable medium of claim 18, wherein displaying the source image in the image preview interface in response to the second request to display the image preview interface comprises retrieving the unmodified source image and selecting a portion of the unmodified source image to display in the image preview interface based on the first and second rendering instructions.

* * * * *